Oct. 12, 1926. 1,603,090

H. MECKE

RESILIENT GEARING

Filed Nov. 28, 1923

Inventor:
Hermann Mecke,
by Alexander S. Lui
His Attorney.

Patented Oct. 12, 1926.

1,603,090

UNITED STATES PATENT OFFICE.

HERMANN MECKE, OF BERLIN, GERMANY, ASSIGNOR TO GENERAL ELECTRIC COMPANY, A CORPORATION OF NEW YORK.

RESILIENT GEARING.

Application filed November 28, 1923, Serial No. 677,556, and in Germany December 5, 1922.

The present invention relates to gearings and more particularly to resilient gearings in which one or more gear members are capable of absorbing shocks and excessive strains due to sudden load or speed changes.

The usual form of resilient or flexible gearing is one having at least one member provided with a gear-toothed rim which may be displaced in a circumferential direction with respect to the hub against a spring shock absorber. In this type of resilient gearing the gear tooth pressure is not relieved when subject to shock and is utilized almost without any reduction to actuate the shock absorber. Resilient action is obtained between shafts coupled by such gearing but without protecting the gear teeth from shock.

It is the object of the present invention to provide an improved resilient gearing in which the gear teeth, as well as the shafts coupled by said gearing, will be protected against excessive strains and shocks.

For a consideration of what is believed to be novel and the invention, attention is directed to the accompanying drawing, description thereof and the appended claims.

Figure 1:
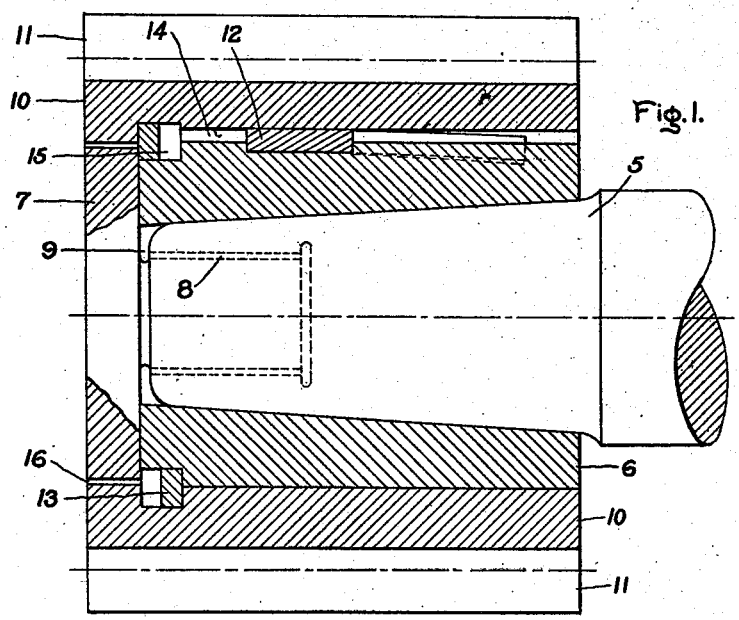
Figure 2:
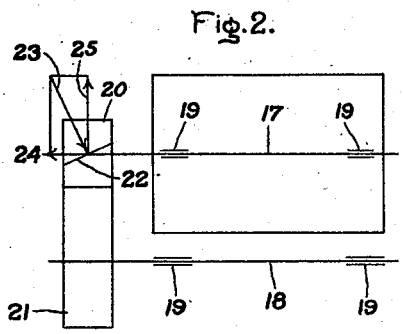
Figure 3:
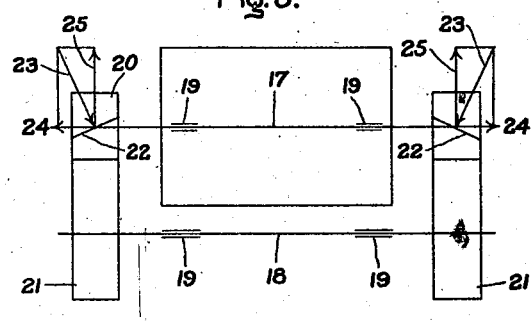
Figure 4:
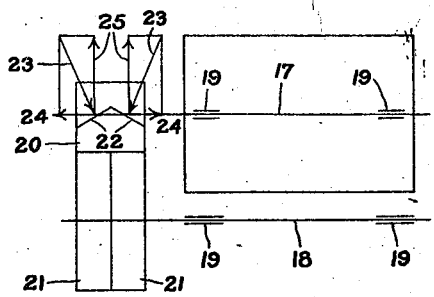

In the drawing, Fig. 1 is a sectional view of a gearing member embodying the invention, and Figs. 2, 3 and 4 are diagrammatical representations of various gearing arrangements for coupling two parallel shafts in which the invention may be embodied.

Referring to Fig. 1 of the drawing, 5 is the tapered end of a shaft on which is forced a sleeve 6. The sleeve is held on the shaft by a retaining cap 7 threaded into the end of the shaft, as indicated at 8, and abutting the sleeve. The length of the sleeve is such that the retaining cap does not meet the shaft end, as indicated by the clearance 9.

The sleeve 6 is provided as a carrying member for a gear or pinion ring 10 provided with spiral or helical teeth 11 for example, on its periphery. The pinion ring is slidable axially and circumferentially on the sleeve 6 but is constrained to move only in a direction to relieve the pressure of excessive strains or shocks on the gear teeth 11 by a helical key 12 and a compressed spring 13.

The key 12 is laid in a slot with closed ends, in the sleeve 6, and fits into an open ended keyway 14 of corresponding spiral shape in the pinion ring 10. The pitch of the key corresponds to the pitch or slant of the gear teeth 11, but is of a right-hand pitch when the gear teeth are left-hand and vice versa so that the pinion ring will respond to the resultant pressure on the teeth 11 and move on and be guided by the key 12 backwardly circumferentially and axially from the line of contact with a cooperating gearing member when shock or stress occurs.

The compressed spring 13 is a coil of one turn and lies in an annular tunnel 15 of rectangular section. This tunnel is formed partly in the sleeve 6 and partly in the pinion ring 10 at the end of the sleeve 6 so that the retaining cap 7 forms a part of its outer side. The retaining cap is of slightly less diameter than the sleeve 6 so that it clears the pinion ring 10, as indicated at 16.

The spring 13 tends to hold the pinion ring 10 in the normal position as shown in the drawing, and is of sufficient strength when compressed, to hold the pinion from movement relative to the shaft and sleeve under ordinary operating conditions. If, however, excessive pressure is brought to bear on the teeth 11 at the point of contact with a cooperating gear wheel, the spring will yield and permit the pinion ring 10 to move along key 12. The direction of movement of the ring 10 axially, depends on its direction of rotation, but it will be seen that the spring 13 absorbs the axial component of the thrust on the gear or pinion in which it is used. The spring is compressible in either direction and when fully compressed forms a locking means or ring in the tunnel 15 for holding the pinion on the shaft, that is, on the carrying member or sleeve 6.

The arrangement in Fig. 1 may be briefly summarized as follows: It comprises a shaft with a helical pinion mounted on it in such a manner that the pinion may move relatively to the shaft in response to shocks and excess stresses, and that the axial component of the shock is, through movement of the pinion, absorbed by a coiled spring. The slant tooth helical type of gearing, together with a guide key of corresponding shape, provides a means for resolving into component parts, one of which is absorbed by a spring, what would in ordinary gearing be circumferential shocks and tooth stresses. That is, the pinion or gear embodying the invention is permitted to move substantially axially to relieve the pressure of shocks or excess stresses.

Referring now to Figs. 1, 2 and 3, several examples of gearings for coupling a pair of parallel shafts are shown, wherein a gear member of the type above described may be incorporated. In these figures, 17 may be considered as the driving shaft and 18 the driven shaft. 19 indicates the shaft bearings. Connecting these shafts are pinions 20 and gears 21 mounted respectively on the driving and driven shafts. The slant or angle of the teeth is indicated on each pinion by a line 22. A line diagram is applied to lines 22 to show the direction of the forces acting on the teeth. In these diagrams, line 23 indicates the resultant tooth pressure, line 24 the axial component of the resultant and line 25 the circumferential component of the resultant.

The flexible gearing of the present invention, as previously pointed out, provides a means for absorbing the axial component of the tooth pressure when the same becomes excessive. That is, the pinion is, by the arrangement hereinbefore described, permitted to move substantially axially of the shaft in the direction of arrowed lines 23 so that the axial component of the tooth pressure 24 may be absorbed by a spring which is compressed axially in the direction of lines 24 instead of being absorbed by the gear teeth.

Viewed in another way, the pinion is permitted to stop while the shaft it is on, moves against a spring action, said spring action absorbing forces directed against it axially of the shaft.

In Figs. 2 and 3 pinions 20 would ordinarily be constructed in acordance with the embodiment of the invention shown in Fig. 1 while the gears 21 would be secured directly to their shafts. Fig. 2 illustrates a single gearing and Fig. 3 a double gearing, one-half at each shaft end. Fig. 4 also shows a double gearing with both halves at the same shaft end. In this arrangement the pinions 20 are joined to form a single pinion, while the driven gears 21 are divided. In this case, the driven gears 21 would be those constructed in accordance with the invention as each must be capable of movement in the direction of arrow 24. Thus the invention may be applied to driven as well as driving gears, because a pinion or gear constructed as in Fig. 1 and applied in any slant toothed, or helical gearing will respond to what may be termed glancing blows and move substantially axially under such blows to permit the force of the same to be absorbed in a spring. It will be noted that the pitch of such gears when employed as in Fig. 3 are opposed to provide a balanced effect on the shaft and in the case of Fig. 4 to permit the gears 21 to move apart when actuated to absorb shocks.

In accordance with the provisions of the patent statutes, the principle of the invention has been described, together with what is now considered to represent the best embodiment thereof, but it should be understood that the invention may be carried out by other means consistent with the appended claims.

What I claim as new and desire to secure by Letters Patent of the United States, is:

1. The combination with an annular ring having helical teeth on its periphery, of a cylindrical carrier member on which said ring is mounted, said ring being rotatably and slidably movable thereon, a retaining annular tunnel formed partly in the ring and partly in the carrier, a compressed helical spring located in said tunnel, and guide means located between the ring and the carrier member for permitting relative movement of said ring and member in a direction substantially at a right angle to the helical teeth.

2. The combination with an annular ring having helical teeth on its periphery, of a cylindrical carrier member on which said ring is mounted, said ring being rotatably and slidably movable thereon, a retaining annular tunnel formed partly in the ring and partly in the carrier, a compressed helical spring located in said tunnel, and guide means located between the ring and the carrier member for permitting relative movement of said ring and member in response to driving pressure on the helical teeth in a direction to relieve said pressure.

3. In a gearing connecting a driving and a driven shaft, the combination of a pair of meshing helical gear members, a carrying means for one of said gear members secured on one of said shafts, and means interposed between the gear member and the carrying means for rendering the gear member resiliently movable axially with respect to said shaft, said means including a spring compressible axially of the shaft and a spiral key having a substantially equal and opposite pitch to that of the teeth of the gear members.

4. The combination with a pair of shafts, of a gearing connecting said shafts, comprising a helical gear member on each of said shafts, one of said gear members being in the form of a ring with teeth on the outer face, a ring-shaped carrying member for said gear ring secured on the shaft and adapted to slidably receive said gear ring concentrically about it, a spiral key secured in the carrying member, a spiral keyway in the gear ring into which the key projects whereby movement of the gear ring is guided by the key, and a compressed spiral spring encircling the shaft positioned between the gear ring and the carrying member to resiliently cushion movement of the gear ring along the key.

5. The combination with a shaft, of a helical gear mounted thereon, and means interposed between said gear and shaft for rendering said gear resiliently movable thereon, said means comprising a helical key of corresponding and oppositely disposed pitch to that of the gear, said key forming a driving connection between the shaft and the gear and a guide on which said gear moves, and a spring resiliently resisting movement of the gear with respect to the shaft.

6. The combination with an annular ring having helical teeth on its periphery, of a cylindrical carrier member on which said ring is mounted, said ring being rotatably and slidably movable thereon, a retaining annular tunnel formed partly in the ring and partly in the carrier, a compressed helical spring located in said tunnel, and guide means located between the ring and the carrier member for permitting relative movement of said ring and member, said means including a helical key which corresponds in pitch to the helical teeth in an opposite direction thereto.

7. The combination with a shaft and a helical gear carried by the shaft, of means interposed between the gear and shaft for permitting said gear to move relatively to the shaft in response to driving pressure normal to the gear teeth, said means comprising a compressed helical spring of a single turn surrounding said shaft within an annular tunnel and a helical guide key of corresponding opposite pitch to that of the helical gear on which said relative movement takes place.

In witness whereof, I have hereunto set my hand this 10th day of November, 1923.

HERMANN MECKE.